US012748303B2

(12) United States Patent
Masamoto et al.

(10) Patent No.: US 12,748,303 B2
(45) Date of Patent: Sep. 29, 2026

(54) ROTARY RECIPROCATING ACTUATOR AND OPTICAL SCANNING DEVICE

(71) Applicants: Kai Masamoto, Tokyo (JP); Yuki Takahashi, Tokyo (JP); Yasutaka Kitamura, Tokyo (JP); Masaharu Kagami, Tokyo (JP); Yuki Otsuka, Tokyo (JP)

(72) Inventors: Kai Masamoto, Tokyo (JP); Yuki Takahashi, Tokyo (JP); Yasutaka Kitamura, Tokyo (JP); Masaharu Kagami, Tokyo (JP); Yuki Otsuka, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 223 days.

(21) Appl. No.: 18/788,344

(22) Filed: Jul. 30, 2024

(65) Prior Publication Data

US 2025/0044580 A1 Feb. 6, 2025

(30) Foreign Application Priority Data

Jul. 31, 2023 (JP) ................................ 2023-124832

(51) Int. Cl.
*G02B 26/10* (2006.01)
*H04N 1/113* (2006.01)

(52) U.S. Cl.
CPC ........... *G02B 26/105* (2013.01); *H04N 1/113* (2013.01)

(58) Field of Classification Search
CPC ...... G02B 26/105; G02B 26/10; G02B 26/08; G02B 26/0816; G02B 26/0833; G02B 26/085; G02B 7/1821; G02B 26/12; G02B 26/121; H04N 1/113; H04N 1/1135; G01S 7/4817; H02K 1/14; H02K 33/16; H02K 1/17; H02K 7/14
See application file for complete search history.

(56) References Cited

U.S. PATENT DOCUMENTS 5,170,278 A * 12/1992 Wada .................. G02B 26/121
359/212.1
2023/0025894 A1 1/2023 Takahashi et al.

FOREIGN PATENT DOCUMENTS

CN 203457225 2/2014
JP 4727509 7/2011

OTHER PUBLICATIONS

European Search Report and the European Search Opinion Dated Dec. 20, 2024 From the European Patent Office Re. Application No. 24191512.3. (10 Pages).

* cited by examiner

*Primary Examiner* — Stephone B Allen
*Assistant Examiner* — Adam W Booher

(57) ABSTRACT

A rotary reciprocating actuator including: a movable member including a shaft part with a magnet fixed on, wherein a V-shaped mirror is held such that a ridgeline of the V-shaped mirror is along the shaft part, and the movable member is supported in a rotatable manner back and forth around an axis through the shaft part; and a unit body including a plurality of magnetic poles, a coil member, and a magnetic member, an electromagnetic drive part configured to rotate back and forth the movable member, the magnetic member facing the magnet in the radial direction of the shaft part and being disposed between the plurality of magnetic poles in the circumferential direction to bias the movable member toward an initial position of back- and forth rotation by attracting the magnet.

11 Claims, 9 Drawing Sheets

ROTARY RECIPROCATING ACTUATOR AND OPTICAL SCANNING DEVICE

CROSS REFERENCE TO RELATED APPLICATIONS

This application is entitled to (or claims) the benefit of Japanese Patent Application No. 2023-124832, filed on Jul. 31, 2023, the disclosure of which including the specification, drawings and abstract is incorporated herein by reference in its entirety.

TECHNICAL FIELD

The present invention relates to a rotary reciprocating actuator and an optical scanning device.

BACKGROUND ART

In the related art, as an actuator used for optical scanning devices such as multifunctional devices and laser beam printers, a rotary reciprocating actuator has been used. More specifically, a rotary reciprocating actuator performs optical scanning of an object by changing the reflection angle of the laser light by rotating back and forth the mirror of the scanner.

As a rotary reciprocating actuator of the above-described type, a rotary reciprocating actuator using a galvano motor disclosed in PTL 1 is known. Various types of galvano motors are known, such as one with the structure disclosed in PTL 1, and a coil movable one with a coil attached to a mirror.

PTL 1 discloses a beam scanner in which four permanent magnets are provided to a rotation shaft to which a mirror is attached so as to be magnetized in the rotation shaft radial direction, and a core with a magnetic pole around which the coil is wound is disposed to sandwich the rotation shaft.

The beam scanner disclosed in PTL 1 has a so-called moving magnet configuration in which the magnet is disposed on the movable member side, and the movable member is not influenced by the heat of the coil during the drive unlike a coil movable type rotary reciprocating actuator. Specifically, at the movable member, the heat of the coil does not have a negative influence on the mirror, such as the state of mirror surface, the attached state of the mirror on the rotation shaft, and the mirror shapes including warp, through rotation shaft and the like. In addition, when high mirror amplitude is achieved by increasing the angle of view of scanning, there is no need to consider the heat generated by the coil during energization unlike the coil movable type, and therefore the configuration can be achieved by enlarging the mirror and increasing the current input to the coil for moving the mirror.

CITATION LIST

Patent Literature

PTL 1
Japanese Patent Publication No. 4727509

SUMMARY OF INVENTION

Technical Problem

With the known configurations, however, the product itself becomes larger as the mirror becomes larger, making it difficult to reduce the height of the product although it is possible to achieve a wide angle, i.e., high amplitude, by increasing the size of the mirror. In addition, with the configuration disclosed in PTL 1, the use of four-pole magnets complicates the assembly and reduces assemblability. Based on these considerations, in the field of scanners, a rotary reciprocating drive system that is easy to assemble, has high accuracy and a wide angle, and can be driven at a high amplitude while achieving a low profile is desired.

An object of the present invention is to provide a rotary reciprocating actuator and an optical scanning device that can be easily assembled, and can be driven while achieving height reduction, wide angle, and high amplitude.

Solution to Problem

To achieve the above-mentioned object, a rotary reciprocating actuator of the present invention includes: a movable member including a shaft part with a magnet fixed on an outer periphery, wherein a V-shaped mirror is held such that a ridgeline of the V-shaped mirror is along the shaft part, and the movable member is supported in a rotatable manner back and forth around an axis through the shaft part; and a unit body including a plurality of magnetic poles, a coil member, and a magnetic member, the plurality of magnetic poles facing the magnet in a radial direction of the shaft part and being separated from each other in a circumferential direction of the shaft part, the coil member being configured to form, together with the magnet, an electromagnetic drive part configured to rotate back and forth the movable member, the magnetic member facing the magnet in the radial direction of the shaft part and being disposed between the plurality of magnetic poles in the circumferential direction to bias the movable member toward an initial position of back- and forth rotation by attracting the magnet. The electromagnetic drive part sways the V-shaped mirror while maintaining an angle of the V-shaped mirror by rotating back and forth the movable member.

An optical scanning device of the present invention includes: the above-described rotary reciprocating actuator; and a light irradiation part configured to apply scan light to the V-shaped mirror of the rotary reciprocating actuator.

Advantageous Effects of Invention

According to the present invention, it is possible to achieve easy assembling and driving while achieving height reduction, wide angle, and high amplitude.

DESCRIPTION OF EMBODIMENTS

An embodiment of the present invention is described below with reference to the accompanying drawings.

Figure 1:
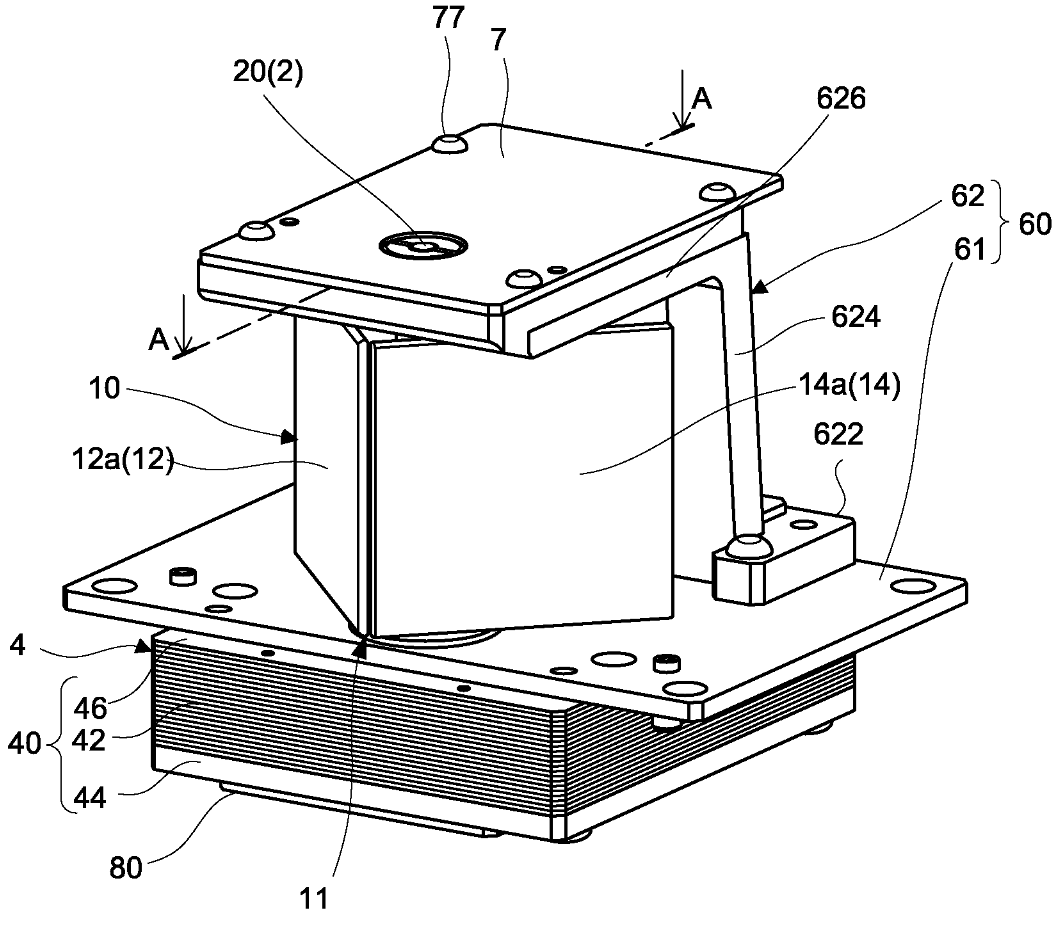
FIG. 1 is an external appearance perspective view of a rotary reciprocating actuator according to an embodiment of the present invention.
Figure 2:
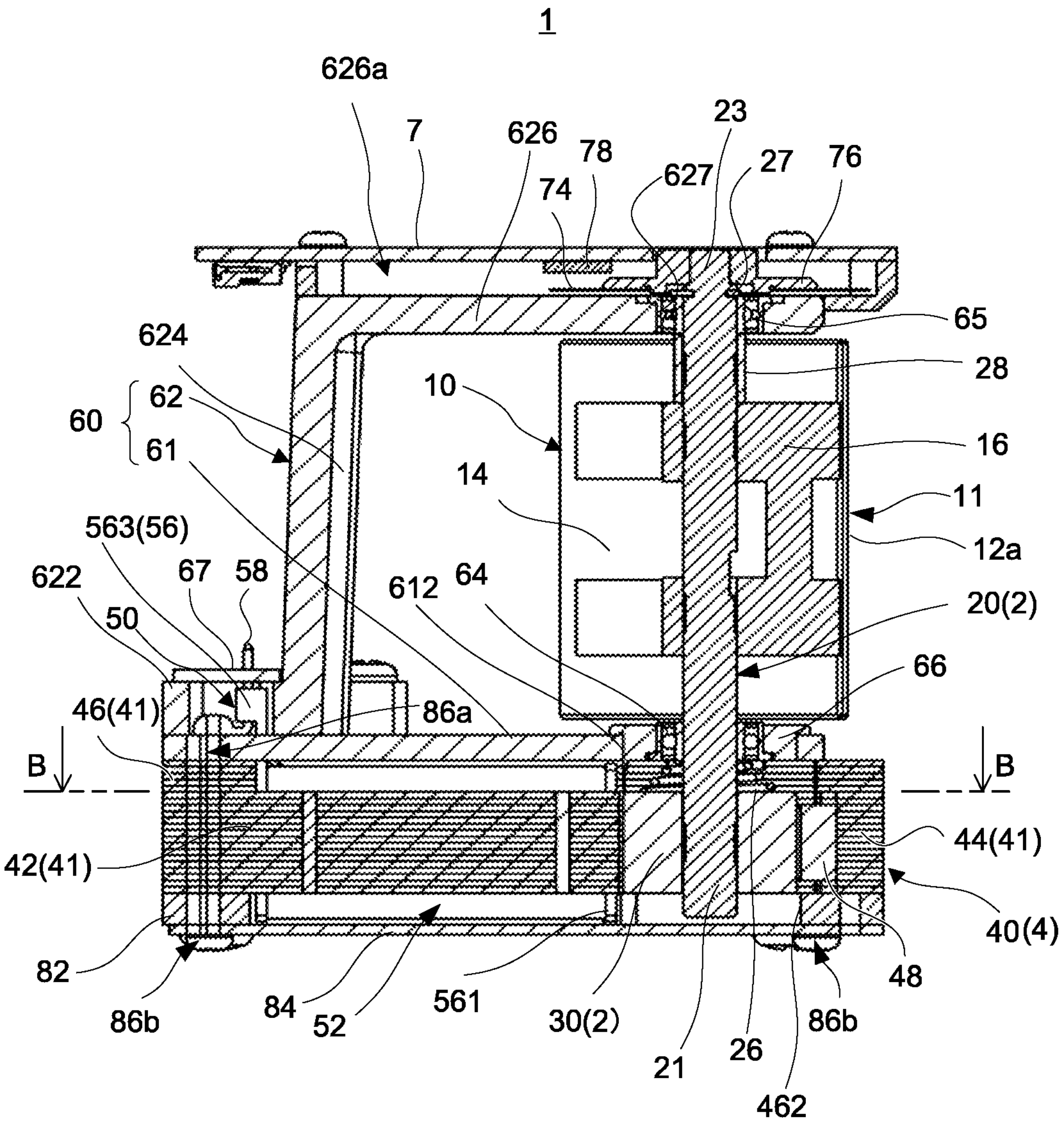
FIG. 2 is a longitudinal sectional view taken along the shaft center of the rotary reciprocating actuator.
Figure 3:
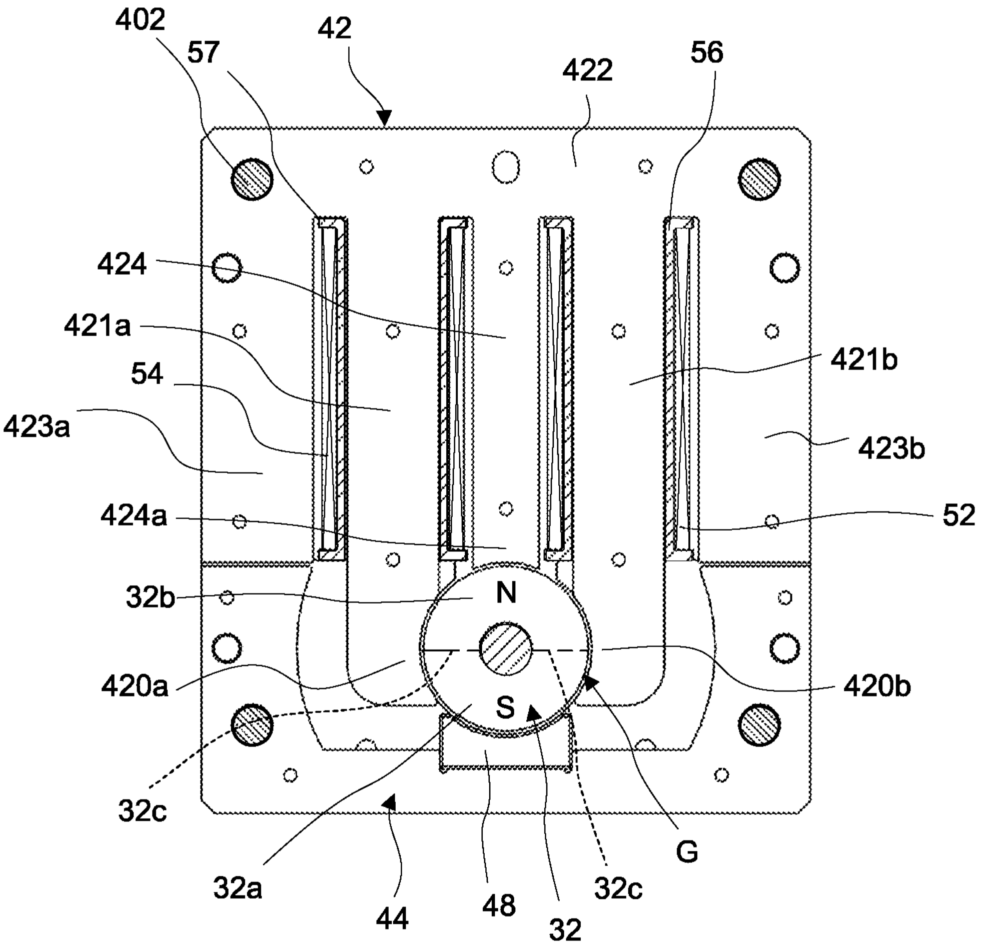
FIG. 3 is a sectional view taken along line B-B in FIG. 2.
Figure 4:
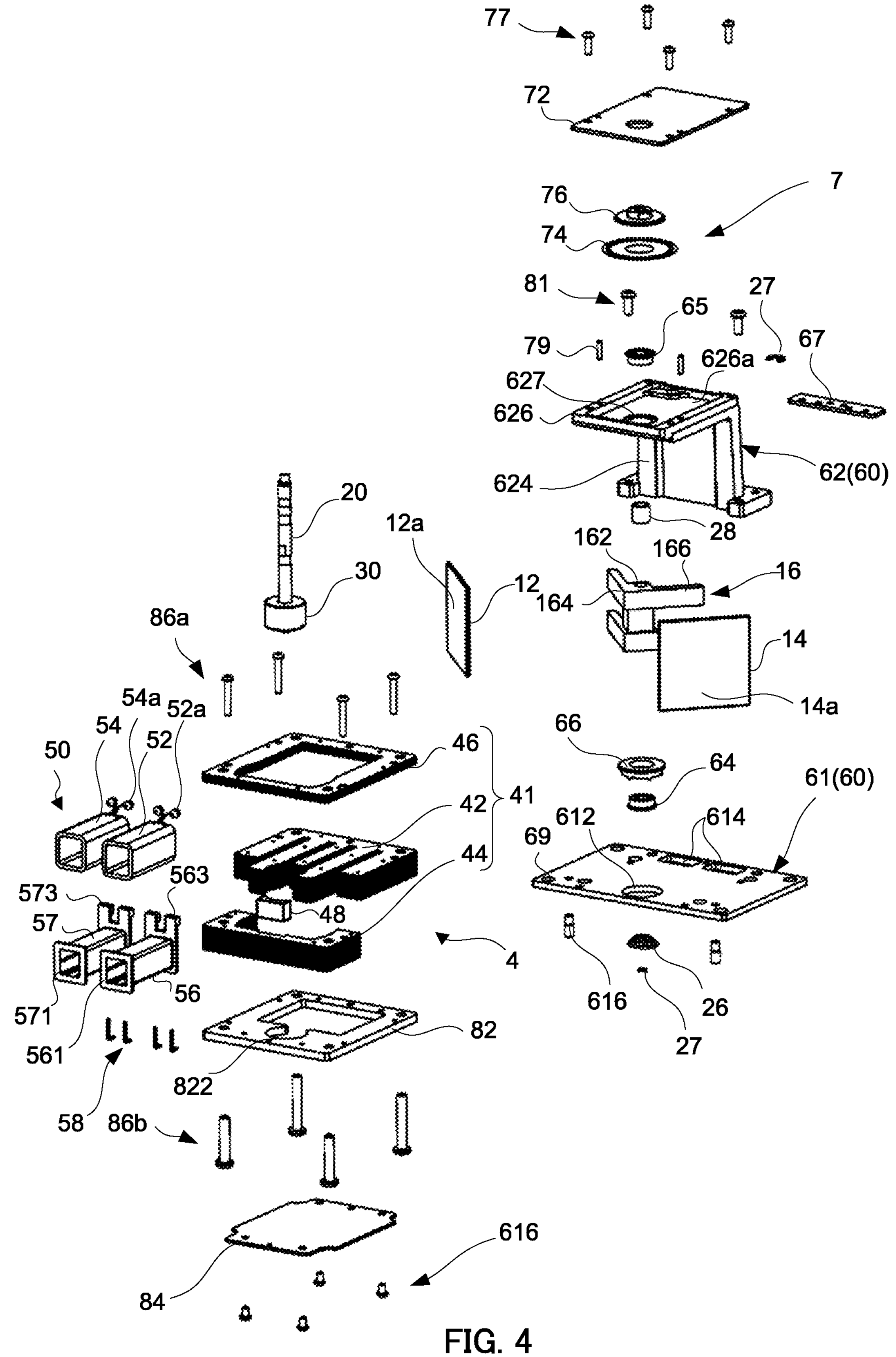
FIG. 4 is an exploded top perspective view of the rotary reciprocating actuator according to the embodiment of the present invention.
Figure 5:
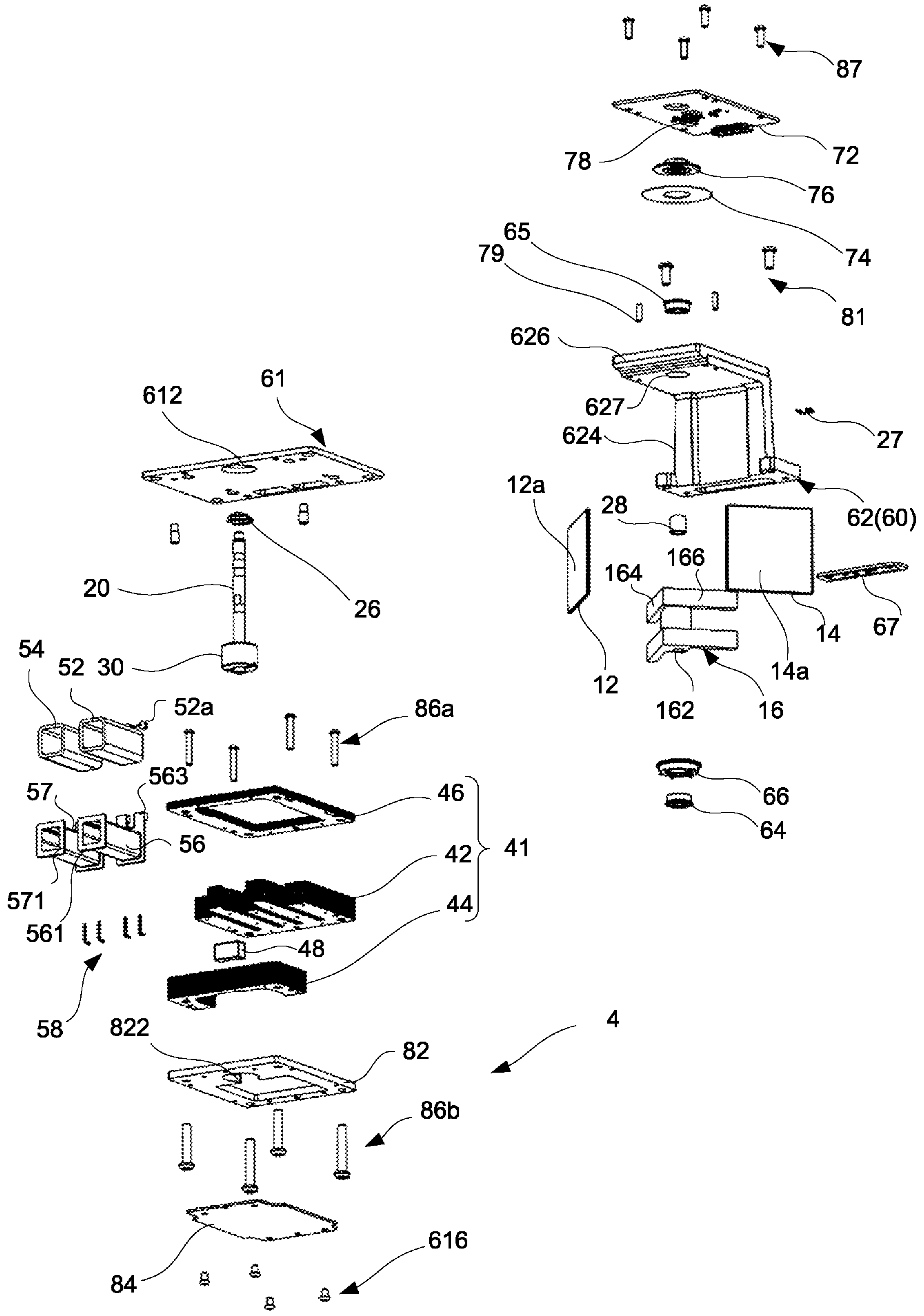
FIG. 5 is an exploded bottom perspective view of the rotary reciprocating actuator.

FIG. 1 is an external appearance perspective view of a rotary reciprocating actuator according to an embodiment of the present invention, and FIG. 2 is a longitudinal sectional view taken along the shaft center of the rotary reciprocating actuator. In addition, FIG. 3 is a sectional view taken along line B-B in FIG. 2, FIG. 4 is the rotary reciprocating actuator exploded top perspective view, and FIG. 5 is an exploded bottom perspective view of the rotary reciprocating actuator.

General Configuration of Rotary Reciprocating Actuator

Rotary reciprocating actuator 1 is used for a LiDAR (Laser Imaging Detection and Ranging) device, for example. Note that rotary reciprocating actuator 1 is also applicable to optical scanning devices such as multifunctional devices and laser beam printers.

Rotary reciprocating actuator 1 roughly includes V-shaped mirror 10, drive unit 4 including movable member 2 fixed to V-shaped mirror 10, and frame part 60 that supports V-shaped mirror 10 through drive unit 4. In addition, in rotary reciprocating actuator 1, drive unit 4 includes unit body 40 that makes up a fixing body including core assembly 41, and movable member 2. Drive unit 4 is fixed to frame part 60, and movable member 2 includes rotation shaft 20, and magnet (permanent magnet) 30 fixed to rotation shaft 20.

Drive unit 4 includes an electromagnetic drive part including coil member 50 disposed at core assembly 41 and magnet 30, and electromagnetic drive part rotates movable member 2 back and forth to sway the V-shaped mirror while maintaining the angle of the V-shaped mirror.

In addition, movable member 2 includes rotation shaft 20 with magnet 30 fixed on the outer periphery, and holds V-shaped mirror 10 with ridgeline 11 of V-shaped mirror 10 aligned with rotation shaft 20. Movable member 2 is supported by unit body 40 (the same applies to frame part 60 to which unit body 40 is fixed) in a rotatable manner back and forth around the shaft through rotation shaft 20.

V-shaped mirror 10 is supported by drive unit 4 fixed to frame part 60 such that it can be driven into back-and-forth rotation with respect to frame part 60 (more specifically, base part 61). Note that frame part 60 includes plate-shaped base part 61, shaft holder 62 and bearings 64 and 65, and makes up a fixing body that supports movable member 2 such that it can be driven into back-and-forth rotation together with unit body 40 of drive unit 4.

The components in rotary reciprocating actuator 1 including drive unit 4 and frame part 60 are assembled by using securing members 77, 81 and 86*a* and the like. Securing member 81 fixes shaft holder 62 to base part 61. Note that securing members 77, 81 and 86*a* are not limited as long as components to be connected can be fixed, but it is preferable to secure the objects to be connected in the axial direction when assembling drive unit 4, or frame part 60, or, drive unit 4 and frame part 60.

Specifically, the components of rotary reciprocating actuator 1 are fixed to each other by connecting or joining them in the axial direction. The securing member may be a bolt and a nut, or a male screw such as a screw, and may be composed of a securing part and a secured part that join objects to be connected by inserting and threadedly engaging them in the axial direction, for example.

V-shaped mirror 10 is a movable object in rotary reciprocating actuator 1, and is connected to rotation shaft 20. V-shaped mirror 10 includes two reflecting surfaces 12*a* and 14*a* adjacent to each other at the ridgeline 11 parallel to rotation shaft 20. V-shaped mirror 10 includes first mirror 12, second mirror 14 and mirror holding part 16, and is formed with first mirror 12 and second mirror 14 held at mirror holding part 16 by means of bonding and the like. In V-shaped mirror 10, the surfaces (reflecting surfaces) 12*a* and 14*a* of first mirror 12 and second mirror 14 are irradiated with scan lines. In V-shaped mirror 10, rotation shaft 20 is integrally provided in such a manner that it is inserted and firmly fixed in insertion hole 162 of mirror holding part 16. Details of the attached positions of V-shaped mirror 10 and rotation shaft 20 are described later.

Together with drive unit 4, frame part 60 supports V-shaped mirror 10 in a turnable manner back and forth. Frame part 60 supports V-shaped mirror 10 at a position sandwiching V-shaped mirror 10 with a pair of opposite walls with base part 61 and shaft holder 62.

Base part 61 has a plate shape, and shaft holder 62 is disposed upright from base part 61 at the surface (for example, the front surface) on the one side in the axial direction (thickness direction). Unit body 40 of drive unit 4 is attached at the other surface (rear surface) of base part 61. Base part 61 and unit body 40 of drive unit 4 are fixed by being secured in parallel to the axial direction through securing member 86*a* and secured member 86*b*, for example.

Shaft holder 62 holds V-shaped mirror 10 of rotation shaft 20 together with base part 61. Holder 62 includes upright wall 624 disposed upright from base part 61 along the axial direction, and opposite wall 626 connected and bent at the tip end of upright wall 624 to face base part 61.

Base part 61 and opposite wall 626 are disposed to face each other through upright wall 624 to hold V-shaped mirror 10 sandwiched therebetween through rotation shaft 20 inserted through opening 612 of base part 61, in a substantially U-shape in cross section.

In this manner, frame part 60 supports the both sides of V-shaped mirror 10 disposed between base part 61 and opposite wall 626 through rotation shaft 20. In this manner, in comparison with a configuration in which V-shaped mirror 10 is supported with rotation shaft 20 axially supported by drive unit 4 in a cantilever manner, it can be supported more firmly, with improved impact resistance and vibration proofness.

In base part 61, connection hole 614 which is extended in the axial direction and through which a part of coil member 50 (coil and bobbin) is inserted is formed. Holding parts 563 and 573 of coil member 50 are inserted to connection hole 614, and coil ends 52*a* and 54*a* disposed at the insertion protruding part are connected to substrate 67. Note that substrate 67 is a power source substrate for power supply to drive the actuator, and is connected to coils 52 and 54 to supply power. Note that holding parts 563 and 573 hold terminal 58, and terminal 58 is set at coil ends 52*a* and 54*a*, and, coil ends 52*a* and 54*a* are dipped (soldered) to terminal 58.

Base part 61 and opposite wall 626 are disposed to face each other with a space therebetween in the axial direction. Base part 61 and opposite wall 626 axially support in a turnable manner rotation shaft 20 inserted therethrough, through bearings 64 and 65, respectively.

Specifically, bearing 64 is provided and fit in bearing housing 66, and the entire bearing housing 66 is fit to opening 612 of base part 61 (base part 61 functions as a shaft supporting body).

In addition, bearing 65 includes a flange that is internally fitted to insertion hole 627 of opposite wall 626 disposed to face opening 612, and is engaged with the surface of the wall so as to restrict the movement of rotation shaft 20 to one end portion 21 side.

On the other hand, bearing 64 includes a flange that restricts the movement to the 23 side with respect to bearing housing 66, and is fit to bearing housing 66. In addition, bearing housing 66 is fixed to base part 61 by means of caulking and the like so as to restrict the movement to the other end portion 23 side of bearing 64.

In this manner, when bearings 64 and 65 are attached to frame part 60 in assembling of rotary reciprocating actuator 1, the attaching state of bearings 64 and 65 to base part 61 and opposite wall 626 can be easily visually recognized from the axial direction.

Bearings 64 and 65 may be composed of a plain bearing or a roll bearing (for example, a ball bearing) for base part 61. For example, in the case where bearings 64 and 65 are roll bearings, the friction coefficient is low and rotation shaft 20 can be smoothly rotated, thus improving the driving performance of rotary reciprocating actuator 1.

In this manner, rotation shaft 20 is attached in a rotatable manner to frame part 60 through bearings 64 and 65, so as to dispose in a rotatable manner back and forth V-shaped mirror 10 serving as a movable object between the pair of opposite base part 61 and opposite wall 626.

Rotation shaft 20 is provided across base part 61 and shaft holder 62 through bearings 64 and 65. Through rotation shaft 20, V-shaped mirror 10 is supported in a rotatable manner back and forth in the direction around the shaft rotation shaft 20 between base part 61 and shaft holder 62.

In rotation shaft 20, magnet 30 is disposed at one end portion 21 protruding outward of base part 61 through bearing 64.

Cylindrical spacer 28 is inserted outside rotation shaft 20 at a portion between mirror holding part 16 of V-shaped mirror 10 and opposite wall 626 to which the other end portion 23 of rotation shaft 20 is inserted.

In rotation shaft 20, the movement of V-shaped mirror 10 to one end portion 21 side is restricted by stopper part 27, and the movement to the other end portion 23 side is restricted by the biasing force of preload spring 26 that biases magnet 30 to one end portion 21 side through bearing 64.

Stopper part 27 is also called stop ring, and is fit in the outer side portion of the opposite wall 626 in a radially outwardly protruded manner at the other end portion 23 of rotation shaft 20 inserted through opposite wall 626.

Together with stopper part 27, spacer 28 restricts, within a predetermined range including tolerance, the movement of movable member 2 including rotation shaft 20 and magnet 30, and V-shaped mirror 10 in the axis direction, thus preventing removal of base part 61. Note that regarding magnet 30 itself, the movement to the other end portion 23 side is restricted by bearing 64.

Preload spring 26 is inserted outside a portion protruding to the outside (one end portion 21 side) of frame part 60 (base part 61) in rotation shaft 20. Preload spring 26 is disposed between base part 61 (more specifically, bearing 64) and magnet 30.

Preload spring 26 expands and contracts in the axial direction to bias bearing 64 in the axial direction through magnet 30. Preload spring 26 applies a constant preload to bearing 64. With the constant preload applied to bearing 64 by preload spring 26, expansion and contraction of rotation shaft 20 due to the temperature difference between rotating rotation shaft 20 and base part 61, variation of load and the like are absorbed by preload spring 26. This can achieve a stable preload amount with small variation in the amount of preload with respect to bearing 64. In this manner, preload spring 26 can prevent high speed rotation of rotation shaft 20 and axial vibration of rotation shaft 20, and can achieve rotation drive with a higher speed in comparison with fixed position preload, thus preventing axial vibration.

Preload spring 26 may be a compression spring that has a predetermined length corresponding to the space where it is disposed and includes flat surfaces formed at the both ends in the predetermined longitudinal direction, or more preferably preload spring 26 may be a cone spring that enables large deflection. With a cone spring, effective biasing force can be obtained even when it is disposed in a limited region.

In this manner, preload spring 26 is disposed between bearing (in particular, ball bearing) 64 and magnet 30, and applies a preload to bearing 64 such that stable driving can be performed while maintaining low slidability and high reliability of the rotation of rotation shaft 20. Note that in other words, preload spring 26 preliminarily applies a biasing force to magnet 30 so as to move magnet 30 in the direction away from bearing 64, thus restricting the movement of magnet 30 to base part 61 side or bearing 64 side.

Magnet 30 is disposed at a portion protruding outward from base part 61 at one end portion 21 of rotation shaft 20. Magnet 30 is disposed inside drive unit 4 described later, for example. Magnet 30 is driven into back-and-forth rotation with the magnetic flux generated by drive unit 4. Specifically, rotation shaft 20 is driven together with magnet 30 that rotates back and forth through mutual electromagnetic operation of drive unit 4 and magnet 30, so as to rotate V-shaped mirror 10 back and forth.

In addition, since preload spring 26 is disposed inside rotary reciprocating actuator 1, stable preload design can be ensured without being affected by the outside of rotary reciprocating actuator 1.

Note that instead of the cylindrical coil spring composed of a round steel wire wound in a spiral from, preload spring 26 may be a wavy spring composed of a plate-shaped steel wire wound in a spiral or annular form and a wave form as a spring that is low in the extending direction, i.e., the spring height.

Unit Body 40

Unit body 40 illustrated in FIGS. 2 to 5 makes up a part of the fixing body by surrounding magnet 30 of movable member 2 in the direction orthogonal to the axial direction.

Unit body 40 is provided on one side of frame part 60 in the axis direction, i.e., at the outer surface (rear surface) of base part 61, so as to be driven through energization to coils 52 and 54 and driven in conjunction with magnet 30, thus moving movable member 2.

Unit body 40 is formed in a rectangular columnar shape or a plate shape, such that the front surface as one surface in the axial direction is covered with base part 61 and that the rear surface as the other surface in the axial direction is covered with bottom cover 84. Unit body 40 includes coil member 50 including coils 52 and 54 and bobbins 56 and 57 around which coils 52 and 54 are wound, core assembly 41, and neutral position holding part 48.

In the present embodiment, unit body 40, or more specifically, core assembly 41, is formed in a rectangular frame block shape (specifically, cuboid shape) with magnetic poles 420*a* and 420*b* arranged inside.

At the outer peripheral portion of the frame shape of core assembly 41, unit body 40 is formed to surround magnetic poles 420*a* and 420*b* disposed inside the outer periphery portion. Unit body 40 is disposed inside the outer periphery portion along the rectangle in the rear surface of base part 61 that is a rectangular region as viewed in the axial direction with respect to base part 61, and includes one magnetic path where magnet 30 is disposed on the magnetic path, for example.

Core Assembly 41

Core assembly 41 makes up a magnetic circuit including a magnetic path disposed to surround magnet 30 and coils 52 and 54 from the four sides orthogonal to the axial direction. Core assembly 41 includes a square magnetic path with adjacent sides with substantially the same length. The magnetic path of core assembly 41 has a shape surrounding the portion where coils 52 and 54 are inserted outside, magnet 30, and magnetic poles 420*a* and 420*b* from four sides in the radial direction of magnet 30.

Core assembly 41 includes first core 42 integrally including a plurality of magnetic poles 420*a* and 420*b*, second core 44 disposed adjacent to the first core to surround the plurality of magnetic poles 420*a* and 420*b* with first core 42, and frame shaped third core 46 that couples first core 42 and second core 44. In core assembly 41, the first to third cores are magnetically coupled and integrated.

First core 42 to third core 46 make up one magnetic path with magnet 30 sandwiched by magnetic poles 420*a* and 420*b*, and allow, to transmit to the plurality of magnetic poles 420*a* and 420*b*, the magnetic flux that is generated when coils 52 and 54 are energized.

Each of first core 42 to third core 46 is a lamination core composed of a stack of electromagnetic steel sheets (laminate members) such as silicon steel sheets, for example. With core assembly 41 having the lamination structure, first core 42 to third core 46 with complex shapes can be achieved in a cost-effective manner.

First Core 42

First core 42 includes a plurality of rod members 421 (421*a* and 421*b*) disposed in parallel and including respective opposite magnetic poles 420*a* and 420*b*, connection side portion 422 and lateral side portions 423*a* and 423*b* disposed to surround rod member 421 from three sides, and commutating pole part 424.

In first core 42, magnetic poles 420*a* and 420*b* are disposed at the end portions of the plurality of rod members 421*a* and 421*b*. Connection side portion 422 extending perpendicular to the extending direction of rod members 421*a* and 421*b* is connected at the base end portions of rod members 421*a* and 421*b*, and both side portions 423*a* and 423*b* are protruded upright in parallel to rod members 421*a* and 421*b* at both end portions of connection side portion 422. Together with lateral side portions 423*a* and 423*b* on both sides of connection side portion 422, connection side portion 422 is disposed in a C-shape that surrounds the plurality of rod members 421*a* and 421*b* from three sides.

Details of first core 42 are described below. Rod member 421 (421*a*, 421*b*), connection side portion 422, lateral side portion 423 (423*a*, 423*b*) and commutating pole part 424 are an integral structure, and first core 42 is formed in a so-called comb-tooth shape.

At the end portions of rod members 421*a* and 421*b*, magnetic poles 420*a* and 420*b* are disposed to face each other with magnet 30 therebetween in the direction orthogonal to the extending direction of rod members 421*a* and 421*b*. Magnetic poles 420*a* and 420*b* face magnet 30 in the radial direction of rotation shaft 20, and are disposed separately from each other in the circumferential direction of rotation shaft 20.

Bobbins 56 and 57 of coil member 50 are inserted outside a portion adjacent to magnetic poles 420*a* and 420*b*, i.e., the center portion of rod members 421*a* and 421*b*. When excited through energization to coils 52 and 54, magnetic poles 420*a* and 420*b* at the end portions of rod members 421*a* and 421*b* generate a polarity corresponding to the direction of the energization to coils 52 and 54.

Magnetic poles 420*a* and 420*b* are each have a shape corresponding to the outer peripheral surface of magnet 30, e.g., a shape curved along the outer peripheral surface of the magnet. Such curved shapes are disposed to face each other with magnet 30 therebetween in the direction orthogonal to the extending direction of rod members 421*a* and 421*b*, for example.

Rod members 421*a* and 421*b* have outer dimensions of the outer periphery that allow bobbins 56 and 57 to be inserted outside from the tip end side. Bobbins 56 and 57 may be inserted outside from the tip end side in the extending direction of rod members 421*a* and 421*b*, i.e., the tip ends of magnetic poles 420*a* and 420*b*, and set at the predetermined positions.

Connection side portion 422 makes up one side of rectangular core assembly 41. Connection side portion 422 is disposed to extend orthogonal to the parallel direction of rod members 421*a* and 421*b* and connect at the base end portions of rod members 421*a* and 421*b*.

Mainly, connection side portion 422 connects the base end portions of rod members 421*a* and 421*b*, and both side portions 423*a* and 423*b*. Preferably, both side portions 423*a* and 423*b* are in intimate contact with the both end portions of second core 44, but in this case they are disposed with gaps between both side portions 423*a* and 423*b* and the both end portions of second core 44.

Connection side portion 422 and both side portions 423*a* and 423*b* are provided to be stacked in intimate contact with third core 46 in the axial direction together with second core 44.

With connection side portion 422, the opposite position of the plurality of magnetic poles 420*a* and 420*b* can be accurately disposed without shifting the positions of the plurality of magnetic poles 420*a* and 420*b* at the time of assembling core assembly 41, and in turn at the time of assembling drive unit 4.

On the other hand, at the tip commutating pole 424*a*, with the magnetic attractive force generated between it and opposite magnet 30, commutating pole part 424 sets magnet 30 at a neutral position, which is equidistant to the plurality of magnetic poles 420*a* and 420*b* as the rotation reference for the back-and-forth rotation.

Commutating pole part 424 is extended in parallel to rod members 421*a* and 421*b* between rod members 421*a* and 421*b* in connection side portion 422, and faces the outer periphery of magnet 30 in the radial direction at the tip end.

Commutating pole part 424 is disposed to face neutral position holding part 48, and in the case where neutral position holding part 48 attracts the first pole of magnet 30, commutating pole part 424 and the second pole of magnet 30 are attracted to each other so as to reinforce the attraction state of neutral position holding part 48. Note that neutral position holding part 48 attracts magnet 30 with the magnetic pole generated between it and magnet 30, and holds magnet 30 at a position where the distance between magnetic poles 420*a* and 420*b* during the back-and-forth rotation of magnet 30 is equal and neutral. Details of neutral position holding part 48 are described later.

Commutating pole part 424, composed of a magnetic member, generates a magnetic attractive force between it and the neutral position holding part and magnet 30 (more specifically pole 32*b*), and moves pole 32*b* different from pole 32*a* that is attracted to neutral position holding part 48 to an opposite position (direct front surface) in magnet 30. With this operation, commutating pole part 424 offsets the shaft radial direction load that acts on movable member 2 with the magnetic attractive force in the neutral position holding part 48. Note that "offsets the shaft radial direction load" includes "to offset the shaft radial direction load".

Note that the tip commutating pole (commutating pole surface) that faces the outer peripheral surface of magnet 30 in commutating pole part 424 is a curved surface corresponding to the shape of the outer peripheral surface of magnet 30, and has an entirely uniform gap between it and the outer peripheral surface of magnet 30. Note that commutating pole part 424 is disposed to surround magnet 30 in core assembly 41 together with neutral position holding part 48, and is thus disposed with a minimum space, achieving downsized rotary reciprocating actuator 1.

Coil Member (Coil and Bobbin) 50

As illustrated in FIGS. 2 to 5, coils 52 and 54 are wound around cylindrical bobbins 56 and 57 so as to make up coil member 50. Together with magnet 30, coil member 50 forms an electromagnetic drive part that rotates movable member 2 back and forth.

In bobbins 56 and 57, flanges 561 and 571 are provided at the both end portions of the cylindrical body where coils 52 and 54 are disposed at the outer periphery. One of the flanges of bobbins 56 and 57 is provided with holding parts 563 and 573 partially protruding in the direction orthogonal to the axis of coils 52 and 54. Holding parts 563 and 573 hold terminal (pin terminal) 58 to which the winding of coils 52 and 54 is connected.

Holding parts 563 and 573 hold in an externally exposed manner the other end of L-shape terminal 58 with one end connected to the end portion of the winding of coils 52 and 54. Coil member 50 is inserted on the outside of rod members 421*a* and 421*b* of first core 42 and disposed adjacent to magnetic poles 420*a* and 420*b* of first core 42.

The winding direction of coils 52 and 54 is set such that during the energization, the magnetic flux is favorably generated from one of the plurality of magnetic poles of first core 42 toward the other.

In core assembly 41, coil member 50 is disposed with holding parts 563 and 573 protruding upward, and holding parts 563 and 573 are inserted to connection hole 614 of base part 61 so as connect terminal 58 to substrate 67 when core assembly 41 is fixed to base part 61. Specifically, coils 52 and 54 are connected to substrate 67 such that the magnetic flux is favorably generated from one of the plurality of magnetic poles 420*a* and 420*b* of first core 42 toward the other upon energization to coils 52 and 54.

Second Core 44

Second core 44 is formed in a columnar shape with a C-cross sectional shape, and forms a magnetic path of the magnetic flux at magnetic poles 420*a* and 420*b* when coils 52 and 54 are energized.

Second core 44 has the same thickness (axial length) as both side portions 423*a* and 423*b*, and is connected or adjacent to the tip end surface of both side portions 423*a* and 423*b*.

Second core 44 is fixed to base part 61 and bottom cover 84 such that second core 44 is in intimate contact with third core 46 through securing member 86*a* inserted to mounting hole (securing hole) 402 that is similar to mounting hole (securing hole) 402 provided at both end portions of connection side portion 422 of first core 42. Mounting hole 402 is formed with the same diameter as the through hole of bottom cover 84, so as to extend in parallel to rotation shaft 20. Neutral position holding part 48 is attached to second core 44 at a portion facing magnet 30 at a center portion in the extending direction.

Third Core 46

Third core 46 is formed in a rectangular plate frame shape, and is attached in surface contact with the rectangular frame shape portions composed of first core 42 and second core 44, i.e., connection side portion 422 and both side portion 423 of first core 42, and second core 44.

By connecting first core 42 and second core 44, third core 46 has a predetermined thickness surrounding the plurality of magnetic poles 420*a* and 420*b*, and forms a square frame shaped magnetic path that couples the plurality of magnetic poles 420*a* and 420*b*. The core assembly is fixed to base part 61 through third core 46.

More specifically, third core 46 makes surface contact with connection side portion 422 and both side portions 423*a* and 423*b* of first core 42 in the extending direction of rotation shaft 20.

In this manner, third core 46 is disposed around rotation shaft 20 so as to surround coils 52 and 54 and the magnetic pole of rod members 421*a* and 421*b*, thus making up a seamless magnetic path around rotation shaft 20.

First to third cores 42 to 43 include a surrounding part that surrounds coils 52 and 54, and can form a magnetic flux flow that goes in the order from first core 42, third core 46, second core 44, third core 46, and the other magnetic pole of first core 42 from one magnetic pole of magnetic poles 420*a* and 420*b*. Note that the surrounding part includes the entirety of both side portions 423*a* and 423*b*, connection side portion 422, and third core 46, for example. In addition, the frame shaped surrounding part at first to third cores 42 to 43 surrounds magnet 30 between magnetic poles 420*a* and 420*b* and magnetic poles 420*a* and 420*b*, and it is thus possible to prevent external members from making contact with coils 52 and 54 from the outside.

In the state where drive unit 4 has been assembled, rotation shaft 20 is inserted to the space surrounded by the magnetic pole. In addition, magnet 30 attached to rotation shaft 20 is located at this space, and the magnetic pole faces magnet 30 with air gap G therebetween at a correct position.

Magnet 30

Magnet 30 is a ring magnet with S pole 32*a* and N pole 32*b* alternately disposed in the circumferential direction. In the state where rotary reciprocating actuator 1 has been assembled, magnet 30 is attached to the peripheral surface of rotation shaft 20 so as to be located at the space surrounded by magnetic poles 420*a* and 420*b* of fixed core assembly 41, neutral position holding part 48 and the commutating pole. Magnet 30 is fixed so as to surround the outer periphery of rotation shaft 20. When coils 52 and 54 are energized, first core 42 including rod members 421*a* and 421*b*, second core 44 and third core 46 are excited such that the polarity corresponding to the energization direction is generated at magnetic poles 420*a* and 420*b*. In this manner, a magnetic force (attraction force and repulsion force) is generated between magnetic poles 420*a* and 420*b* and magnet 30.

In the present embodiment, magnet 30 is a two-pole magnet that is equally magnetized into S pole 32*a* and N pole 32*b*. The number of magnetic poles (in the present embodiment, two) of magnet 30 may be two or more in accordance with the amplitude of the movement of the movable member as long as it is the same as the number of magnetic poles 420*a* and 420*b* of core assembly 41.

The polarity of magnet 30 is switched at boundary portion (magnetic pole switching part) 32*c* of the magnetic poles (S pole 32*a* and N pole 32*b*) that differ in the circumferential direction. When magnet 30 is held at a position at an initial angle corresponding to the initial position (which is the neutral position, and is also referred to as the initial position of movable member 20), magnetic pole switching part 32*c* faces straight each of magnetic poles 420*a* and 420*b*, and thus drive unit 4 generates the maximum torque to stably drive movable member 2 when driven.

Note that with magnet 30 composed of a two-pole magnet, the movable object can be easily driven with high amplitude in conjunction with core assembly 41, while improving the driving performance. Specifically, in comparison with V-shaped mirror 10 configured with a one-surface mirror with the same width, wider-angle amplitude can be achieved. Note that in the embodiment, magnet 30 includes the pair of magnetic pole switching parts 32*c*, but magnet 30 may include two or more pairs of magnetic pole switching parts.

Neutral Position Holding Part (Magnet Initial Angle Position Holding Part) 48

Neutral position holding part 48 illustrated in FIGS. 2 to 5 is incorporated in core assembly 41 in such a manner as to face each other through magnet 30 and air gap G. Neutral position holding part 48 is attached to second core 44 in an orientation with the magnetic pole facing magnet 30. Neutral position holding part 48 is a magnetic member, and is disposed to face magnet 30 in the radial direction of rotation shaft 20 between the plurality of magnetic poles 420*a* and 420*b* in the circumferential direction. Neutral holding part 48 attracts magnet 30 to bias magnet 30 (movable member 2) toward the initial position (initial angle position) of the back- and forth rotation.

Neutral position holding part 48 is a permanent magnet as a magnetic member, and is disposed with the magnetic pole set toward magnet 30 so as to attract magnet 30 with the magnetic attractive force generated between it and magnet 30.

Together with rod members 421*a* and 421*b*, neutral position holding part 48 functions as a magnetic spring formation part that forms a magnetic spring between it and magnet 30. With this magnetic spring, the rotation angle position of magnet 30, i.e., the rotation angle position of rotation shaft 20 is held at the neutral position in a normal state (in non-energization state) where no energization to coils 52 and 54 is performed.

At this time, pole 32*b* (N pole in FIG. 3) on the opposite side of pole 32*a* (S pole in FIG. 3) of magnet 30 that mutually attracts neutral position holding part 48 attracts commutating pole part 424. As described above, neutral position holding part 48 and commutating pole part 424 effectively hold, at the neutral position, magnet 30, i.e., V-shaped mirror 10 as the movable object.

Note that, as described above, the neutral position is a position where magnet 30 is located at the initial angle that serves as a reference when rotating back and forth around the shaft. In addition, the neutral position is a position that is neutral in the back- and forth rotation (sway) for turning left and right with the same distance, and is a position of setting the angle of the left-and-right rotation around the shaft during the back- and forth rotation to the same rotation angle. When magnet 30 is held to the neutral position, magnetic pole switching part (boundary portion) 32*c* of magnet 30 faces straight the magnetic poles of rod members 421*a* and 421*b*.

In addition, the attaching orientation of V-shaped mirror 10 is adjusted with the state where magnet 30 is located at the neutral position as a reference. Note that neutral position holding part 48 may be composed of a magnetic member (non-magnetized magnetic member) that generates a magnetic attractive force between it and magnet 30 instead of the permanent magnet (magnetized magnetic member).

Positioning Cover 82 and Bottom Cover 84

As illustrated in FIG. 2 and FIGS. 4 to 5, core assembly 41 is covered with base part 61 at one surface (top surface) in the axial direction, and is covered with positioning cover 82 and bottom cover 84 at the other surface (bottom surface) in the axial direction.

Positioning cover 82 is formed in a frame shape, and is attached to position magnet 30 and core assembly 41. Clearance such as a movable range can be maintained to achieve a suitable driving circuit while maintaining the distance between core assembly 41 to bottom cover 84. Positioning cover 82 is attached to overlap the outer surface of core assembly 41.

Note that positioning cover 82 is provided with notch part 822 serving as an escaping part of magnet 30, and a hole part such as a through hole, a positioning hole, and a position adjustment hole for fixing to base part 61. These hole parts are formed parallel to the axis direction of rotation shaft 20. By inserting the securing member through the hole, assembling to base part 61 or assembly of drive unit 4, and in turn, assembly of rotary reciprocating actuator 1, can be achieved in one direction of the axial direction.

Bottom cover 84 can prevent entry of contamination into the core assembly from one end portion (one end surface) of rotary reciprocating actuator 1. Note that preferably, bottom cover 84 is composed of a non-magnetic electrical conducting material with high energizing property, and serves as an electromagnetic shield. That is, bottom cover 84 can suppress entry of noise into core assembly 41 and emission of noise from core assembly 41 to the outside.

Bottom cover 84 may be formed of an energizing material with high thermal conductivity and non-magnetic property such as aluminum alloy, for example. Aluminum alloy has high design flexibility, and can easily provide the desired rigidity.

The outer surface (top surface) of opposite wall 626 is formed in a recessed form, and serves as sensor housing part 626*a*. The other end portion 23 of rotation shaft 20 protrudes into opposite wall 626, and is disposed inside recessed sensor housing part 626*a*.

Angle Detection Part 7

Angle detection part 7 is disposed on the front surface (top surface) side of opposite wall 626. Angle detection part 7 detects the rotation of angle of movable member 2 including magnet 30 and rotation shaft 20. Rotary reciprocating actuator 1 can control the rotation angle position and rotational speed of the movable member, or more specifically V-shaped mirror 10 as the movable object during the drive through the control part (omitted in the drawing) on the basis of the detection result of angle detection part 7. Note that the control part may be mounted on substrate 67.

Angle detection part 7 may be a magnetic sensor or an optical sensor. In the present embodiment, angle detection part 7 includes sensor substrate 72, encoder disk 74 housed in sensor housing part 626*a*, encoder hub 76, and optical sensor (sensor) 78 including a light source, a light-receiving element and the like.

Angle detection part 7 detects the rotation of angle of rotation shaft 20, and in turn, V-shaped mirror 10 by detecting the rotation of encoder disk 74. Encoder disk 74 is fixed to the other end portion 23 of rotation shaft 20 through encoder hub 76 inside sensor housing part 626*a*, and rotates together with magnet 30 and V-shaped mirror 10 about rotation shaft 20. The rotation position of encoder disk 74 is the same as the rotation position of rotation shaft 20.

Optical sensor 78, mounted on sensor substrate 72, emits to encoder disk 74 the light that is parallel to the axial direction and detects the rotation position (angle) of encoder disk 74 on the basis of the reflection light. In this manner, the rotation position of magnet 30 and V-shaped mirror 10 can be detected. Optical sensor 78 is mounted on the rear surface of the sensor substrate, and thus housed inside sensor housing part 626*a* with sensor substrate 72.

Optical sensor 78 is mounted on sensor substrate 72 disposed perpendicular to the other end portion 23 of rotation shaft 20, and thus can be easily set at a position facing encoder disk 74 in the rotation shaft direction.

Sensor substrate 72 is attached to the top surface of opposite wall 626 to close sensor housing part 626*a*, and closes sensor housing part 626*a*.

Sensor substrate 72 is a substrate on which optical sensor 78 that detects the rotation of angle of rotation shaft 20 is mounted. Sensor substrate 72 is disposed with optical sensor 78 facing magnet 30 side in the axial direction so as to cover core assembly 41.

Sensor substrate 72 is secured to opposite wall 626 by means of securing member 77, and can prevent entry of external unwanted materials such as foreign matters into the sensing portion of angle detection part 7, i.e., contamination into sensor housing part 626*a*.

In this manner, sensor substrate 72 and opposite wall 626 are fixed in a detachable manner with securing member 77 while achieving the positioning with positioning pin 79 through the hole formed in the same shape extending in the axial direction.

On sensor substrate 72, a circuit that supplies power to coils 52 and 54 may be mounted in addition to the circuit that detects the rotation position (angle) of the encoder disk. In this configuration, the power supply circuit is not mounted on substrate 67.

Positional Relationship Between V-Shaped Mirror and Rotation Shaft

Figure 6:
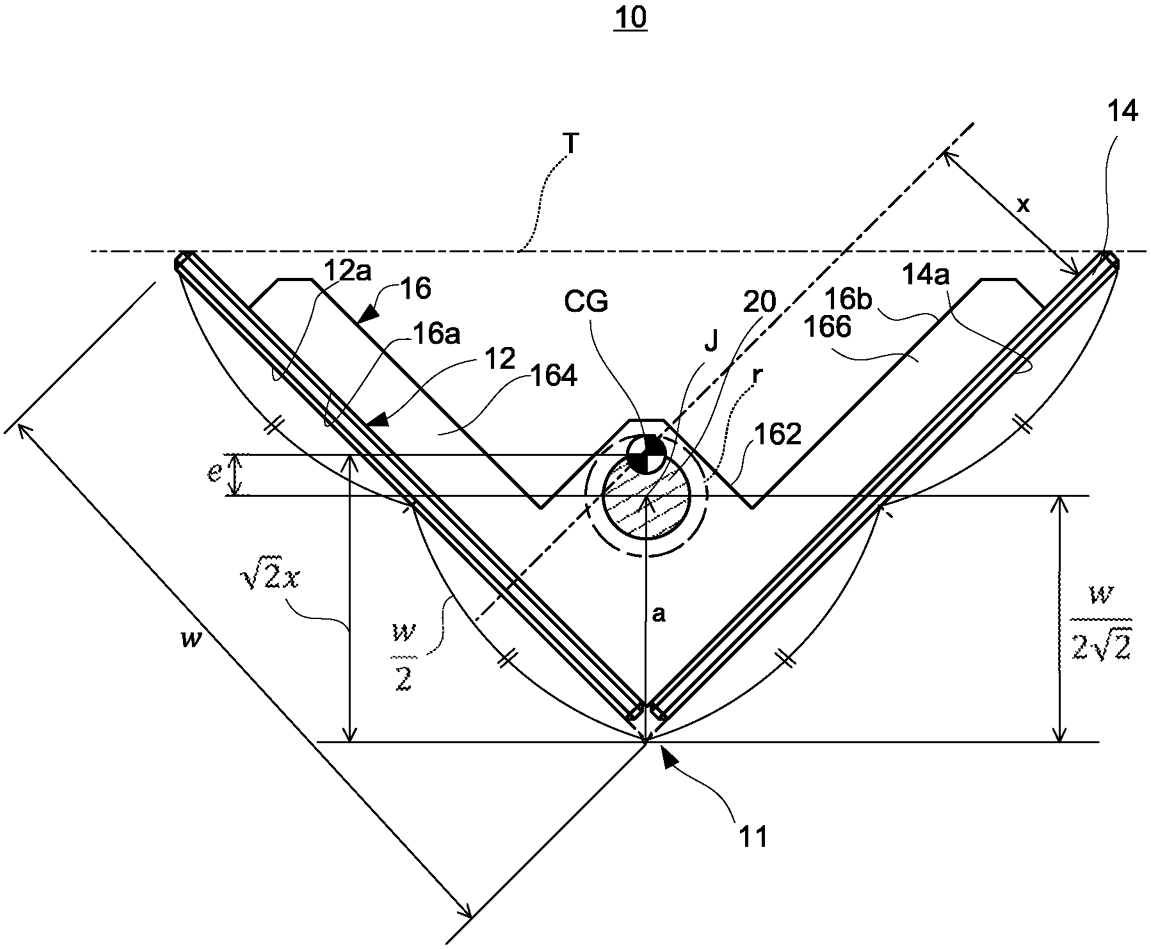
FIG. 6 is a horizontal sectional view illustrating a positional relationship between a mirror holding part and a rotation shaft.

FIG. 6 is a horizontal sectional view illustrating a positional relationship between a mirror holding part and a rotation shaft.

As illustrated in FIGS. 2, 4, and 6, V-shaped mirror 10 is configured with mirror holding part 16 holding first mirror 12 and second mirror 14, and fixed to rotation shaft 20 such that its gravity center CG and center (shaft center) J of rotation shaft 20 are aligned (located close to each other).

First mirror 12 and second mirror 14 are each formed in a rectangular plate shape, and are held by mirror holding part 16 at the rear surfaces opposite to the front surfaces serving as reflecting surfaces 12*a* and 14*a*, for example. First mirror 12 and second mirror 14 are configured such that the distance from rotation shaft 20 to reflecting surfaces 12*a* and 14*a* are the same.

First mirror 12 and second mirror 14 are bilaterally symmetrically disposed about the ridgeline 11 parallel to the shaft center of rotation shaft 20.

When V-shaped mirror 10 is viewed in the axial direction, rotation shaft 20 is disposed inside a triangular region that is formed with first mirror 12, and second mirror 14, and virtual line T connecting the end portions of first mirror 12 and second mirror 14. Specifically, shaft center J of rotation shaft 20 is located inside the triangular region with virtual line T connecting the separated both ends of the mirror portion (first mirror 12, second mirror 14) disposed in a V-shape.

A predetermined angle between first mirror 12 and second mirror 14, which is an angle of the V-shape formed by first mirror 12 and second mirror 14 with the ridgeline 11 at the center is preferably the right angle, but may be an angle smaller than 90 degrees, i.e., an acute angle.

Mirror holding part 16, to which rotation shaft 20 is attached, includes rotation shaft holding part 162 with an outer surface that can hold first mirror 12 and second mirror 14 in a V-shape, and holding frames 164 and 166 extended in a V-shape from the outer surface of the rotation shaft holding part.

Holding frames 164 and 166 have a planar shape, and have a length extending along the width direction (the extending direction in the V shape) of first mirror 12 and second mirror 14 so as to join to the rear surface of first mirror 12 and second mirror 14 to hold them, for example. On the rear surfaces of first mirror 12 and second mirror 14, holding frames 164 and 166 are longer than half, preferably ⅔ or more of, the first mirror 12 and second mirror 14 in the width direction.

For example, holding frames 164 and 166 are belt-shaped members formed in a V-shape, and on the rear side of their ridgeline 11, prism shaped rotation shaft holding part 162 where rotation shaft 20 is inserted and fit is integrally provided, thus making up mirror holding part 16. Mirror holding part 16 may be composed of metal, preferably aluminum. In addition, first mirror 12 and second mirror 14 may be composed of glass or the like.

For example, rotation shaft 20 may be provided within circle r with a predetermined radius (e.g., 3 mm) or smaller around the middle point of the line connecting the middle points of widths w of the two-surface mirrors, i.e., first mirror 12 and second mirror 14. In addition, eccentricity e between the gravity center and the shaft center of the rotation shaft may be provided at a position that satisfies $w/2\sqrt{2}-\sqrt{2}x$ (where x: mirror surface—gravity-to-gravity distance, and w: mirror width).

Mirror holding part 16 and rotation shaft 20 may be joined such that gravity center CG of the V-shaped mirror (including mirror holding part 16, first mirror 12 and second mirror 14) and shaft center J of rotation shaft 20 are adjacent to each other in the above-described manner, and rotation shaft 20 may be disposed at a position including the center of gravity of mirror holding part 16. In addition, mirror holding part 16 is provided such that rotation shaft 20 or the rotation of center of rotation shaft 20 is located in a region sandwiched with the two mirrors in the direction orthogonal to the axial direction.

In addition, mirror holding part 16 includes first mirror 12 and second mirror 14 disposed in the V-shape, V-shaped holding frames 164 and 166 for fixing and holding each mirror, and rotation shaft holding part 162. First mirror 12 and second mirror 14 include ridgeline 11 where adjacent sides are coupled with each other, thus forming the V shape. Holding frames 164 and 166 are disposed on the rear surfaces of mirrors 12 and 14.

Rotation shaft holding part 162 is a thick coupling portion of the V-shape of holding frames 164 and 166 on the rear surface side to fix the holding frames 164 and 166, and has the shaft center extending parallel to the adjacent sides of first mirror 12 and second mirror 14. Rotation shaft holding part 162 is a thick portion provided on the rear surface of the corner portion of the V-shaped holding frame holding the mirrors disposed in the V-shape on the rear surface.

In addition, mirror holding part 16 includes V-shaped front surface 16*a* that holds the V-shaped mirror (which may be formed of one mirror) including first mirror 12 and second mirror 14, and W-shaped rear surface 16*b* on the opposite side, and thus has the shape with the thick portion at the middle bent portion (or may be referred to as the middle bent portion of V-shaped mirror 10) of the front-rear surfaces of mirror holding part 16. Rotation shaft 20 is held at the thick portion.

With such configurations mirror holding part 16 can achieve low-inertia driving while ensuring the rigidity of the mirror.

In this manner, it is possible to prevent increase in load in the radial direction on bearing 64, and increase in drive sound and unnecessary vibration due to eccentricity during reciprocation rotation drive. Note that first mirror 12 and second mirror 14 may be integrally formed in the V-shape.

Figure 7:
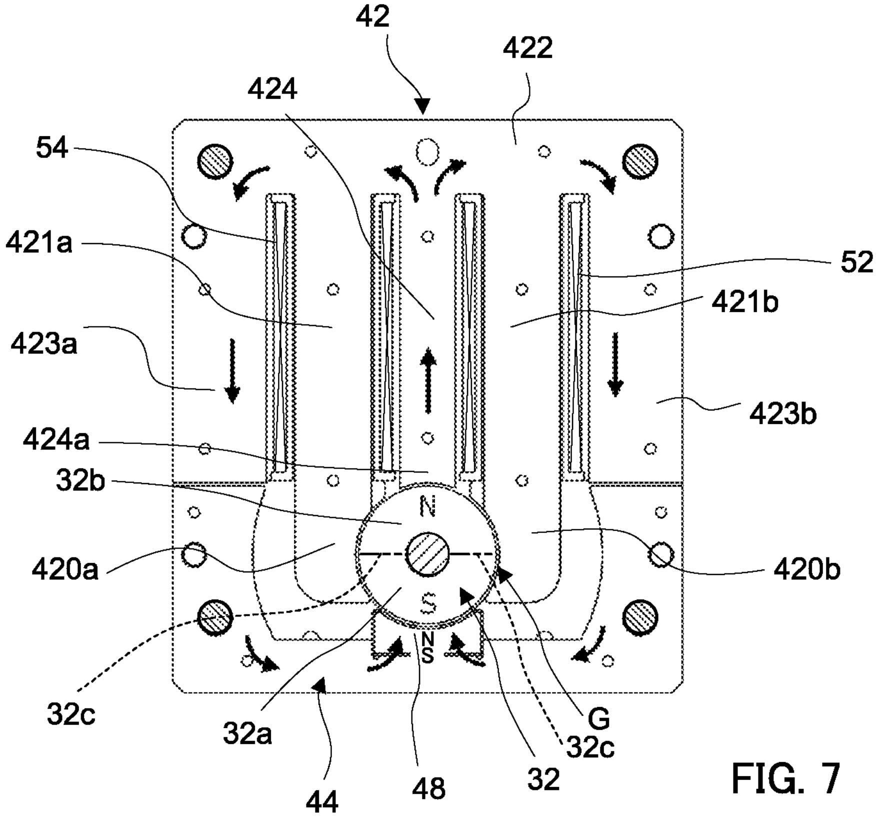
FIG. 7 is a diagram illustrating a magnetic circuit of the rotary reciprocating actuator according to the embodiment of the present invention.

Now operations of rotary reciprocating actuator 1 are described below with reference to FIGS. 7 and 8. FIG. 7 is a diagram illustrating a magnetic circuit of the rotary reciprocating actuator according to the embodiment of the present invention, and FIG. 8 is a diagram for describing an operation of the magnetic circuit of the rotary reciprocating actuator according to the embodiment of the present invention.

As illustrated in FIG. 7, magnetic poles 420*a* and 420*b* of two rod members 421*a* and 421*b* of core assembly 41 of core assembly 41 are disposed to sandwich magnet 30 with air gap G therebetween. In this manner, as illustrated in FIG. 7, in the state where coils 52 and 54 are not energized, magnet 30 is held at the neutral position with the magnetic attractive force between it and neutral position holding part 48.

Figure 8:
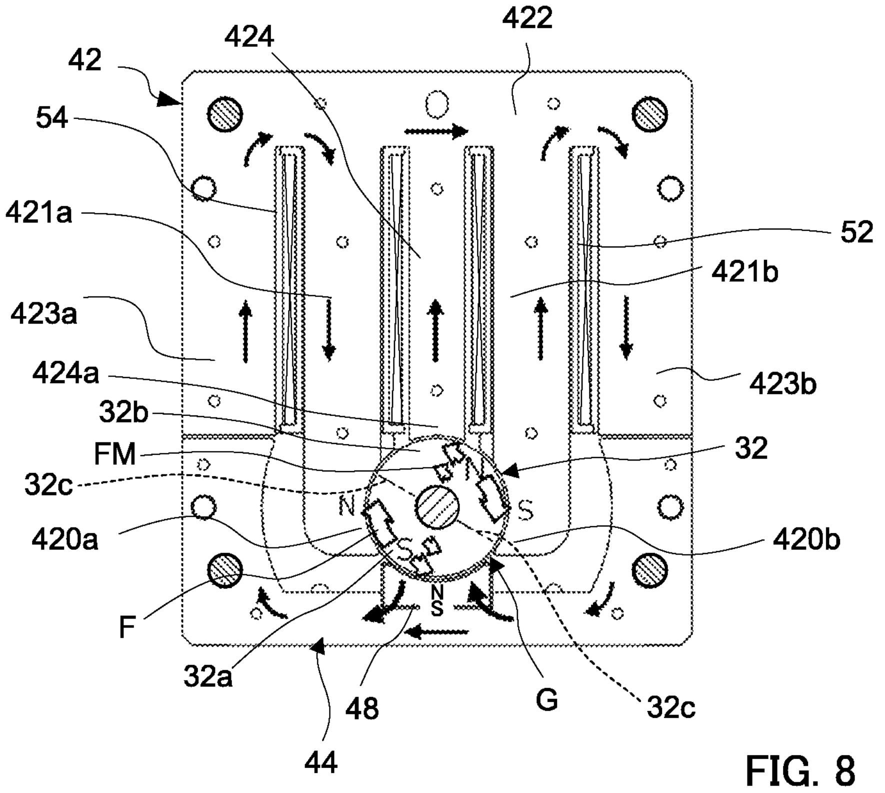
FIG. 8 is a diagram for describing an operation of the magnetic circuit of the rotary reciprocating actuator.

At this neutral position, one of S pole 32*a* and N pole 32*b* of magnet 30 (in FIG. 7, S pole 32*a*) is attracted by neutral position holding part 48 (see magnetic spring torque FM in FIG. 8). At this time, the magnetic pole switching part of magnet 30 is located at a position facing (straight) the center position of magnetic poles 420*a* and 420*b* of core assembly 41. In addition, commutating pole part 424 and the other of S pole 32*a* and N pole 32*b* of magnet 30 (in FIG. 7, N pole 32*b*) are mutually attracted. In this manner, magnet 30 more effectively moves to the neutral position.

When coils 52 and 54 are energized, core assembly 41 is excited, and the polarity corresponding to the energization direction is generated at magnetic poles 420*a* and 420*b*. For example, when coils 52 and 54 are energized as illustrated in FIG. 8, a magnetic flux is generated inside core assembly 41, and magnetic pole 420*a* and magnetic pole 420*b* are set to N pole and S pole, respectively.

In this manner, magnetic pole 420*a* magnetized to N pole and S pole 32*a* of magnet 30 are attracted to each other, and magnetic pole 420*b* magnetized to S pole and N pole 32*b* of magnet 30 are attracted to each other. Then, at magnet 30, a torque in F direction around the axis of rotation shaft 20 is generated, and magnet 30 rotates in F direction. Along with this movement, rotation shaft 20 also rotates in F direction, and V-shaped mirror 10 fixed to rotation shaft 20 also rotates in F direction.

Next, when coils 52 and 54 are energized in the opposite direction, the flow of the magnetic flux generated inside core assembly 41 becomes opposite to the direction illustrated in FIG. 8, and magnetic pole 420*a* and magnetic pole 420*b* are set to S pole and N pole, respectively. Magnetic pole 420*a* magnetized to S pole and N pole 32*b* of magnet 30 are attracted to each other, and magnetic pole 420*b* magnetized to N pole and S pole 32*a* of magnet 30 are attracted to each other. Then, at magnet 30, a torque in the direction opposite to the F direction around the axis of rotation shaft 20 is generated, and magnet 30 rotates in the direction opposite to the F direction. Along with this movement, rotation shaft 20 also rotates, and V-shaped mirror 10 fixed to rotation shaft 20 also rotates in the direction opposite to the direction illustrated in FIG. 8. By repeating the above-described operation, rotary reciprocating actuator 1 drives V-shaped mirror 10 into rotation back and forth.

Note that in practice, rotary reciprocating actuator 1 is driven by AC waves input to coils 52 and 54 from the power supply part (which corresponds to, for example, driving signal supply part 103 in FIG. 32). That is, the energization direction of coils 52 and 54 are periodically switched. At the time when the energization direction is switched, magnet 30 is biased to return to the neutral position with the magnetic attractive force between neutral position holding part 48 and magnet 30, i.e., the restoration force of the magnetic spring (the magnetic spring torque FM illustrated in FIG. 8 and the opposite torque). In this manner, the F direction torque and the torque opposite to the F direction around the axis alternately act on movable member 2. In this manner, movable member 2 is driven into back-and-forth rotation.

A driving principle of rotary reciprocating actuator 1 is briefly described below. In rotary reciprocating actuator 1 of the present embodiment, the movable member vibrates (rotates back- and forth) with respect to the fixing body at resonance frequency $F_r$ [Hz] calculated by expression (1), where J [kg·m$^2$] is the inertia moment of the movable member (movable member 2), and $K_{sp}$ [N·m/rad] is the spring constant in the twist direction of the magnetic spring (magnetic poles 420*a* and 420*b*, neutral position holding part 48 and magnet 30).

(Equation 1)

$$Fr = \frac{1}{2\pi}\sqrt{\frac{K_{sp}}{J}} \quad [1]$$

$F_r$: Resonance frequency [Hz]
J: Inertia moment [Kg·m$^2$]
$K_{sp}$: Spring constant [N·m/rad]

The movable member makes up the mass part of the spring-mass system vibration model, and therefore when AC waves with a frequency equal to resonance frequency $F_r$ of the movable member is input to coils 52 and 54, the movable member is set to a resonance state. Specifically, the movable member can be efficiently vibrated by inputting AC waves with a frequency substantially equal to resonance frequency $F_r$ of the movable member to power supply part coils 52 and 54.

An equation of motion and a circuit equation representing a drive principle of rotary reciprocating actuator 1 are described below. Rotary reciprocating actuator 1 drives based on the equation of motion of expression (2) and the circuit equation of expression (3).

(Equation 2)

$$J\frac{d^2\theta(t)}{dt^2} = K_t i(t) - K_{sp}\theta(t) - D\frac{d\theta(t)}{dt} - T_{Loss} \quad [2]$$

J: Inertia moment [kg·m$^2$]

θ(t): Angle [rad]

$K_t$: Torque constant [N·m/A]

i(t): Current [A]

$K_{sp}$: Spring constant [N·m/rad]

D: Attenuation coefficient [N·m/(rad/s)]

$T_{Loss}$: Load torque [N·m]

(Equation 3)

$$e(t) = Ri(t) + L\frac{di(t)}{dt} + K_e\frac{d\theta(t)}{dt} \quad [3]$$

e (t): Voltage [V]

R: Resistance [Ω]

L: Inductance [H]

$K_e$: Counterelectromotive force constant [V/(rad/s)]

Specifically, inertia moment J [kg·m$^2$], rotation angle θ(t) [rad], torque constant $K_t$ [N·m/A], current i(t) [A], spring constant $K_{sp}$ [N·m/rad], attenuation coefficient D [N·m/(rad/s)], load torque $T_{Loss}$ [N·m] and the like of the movable member in rotary reciprocating actuator 1 may be changed as long as expression (2) is satisfied. In addition, voltage e(t) [V], resistance R[Ω], inductance L [H], and counterelectromotive force constant $K_e$ [V/(rad/s)] may be changed as long as expression (3) is satisfied.

In this manner, rotary reciprocating actuator 1 can obtain efficient large vibration outputs when the coil is energized with AC waves corresponding to resonance frequency $F_r$ that is determined by inertia moment J of the movable member and spring constant $K_{sp}$ of the magnetic spring.

Assembling Structure

Figure 9:
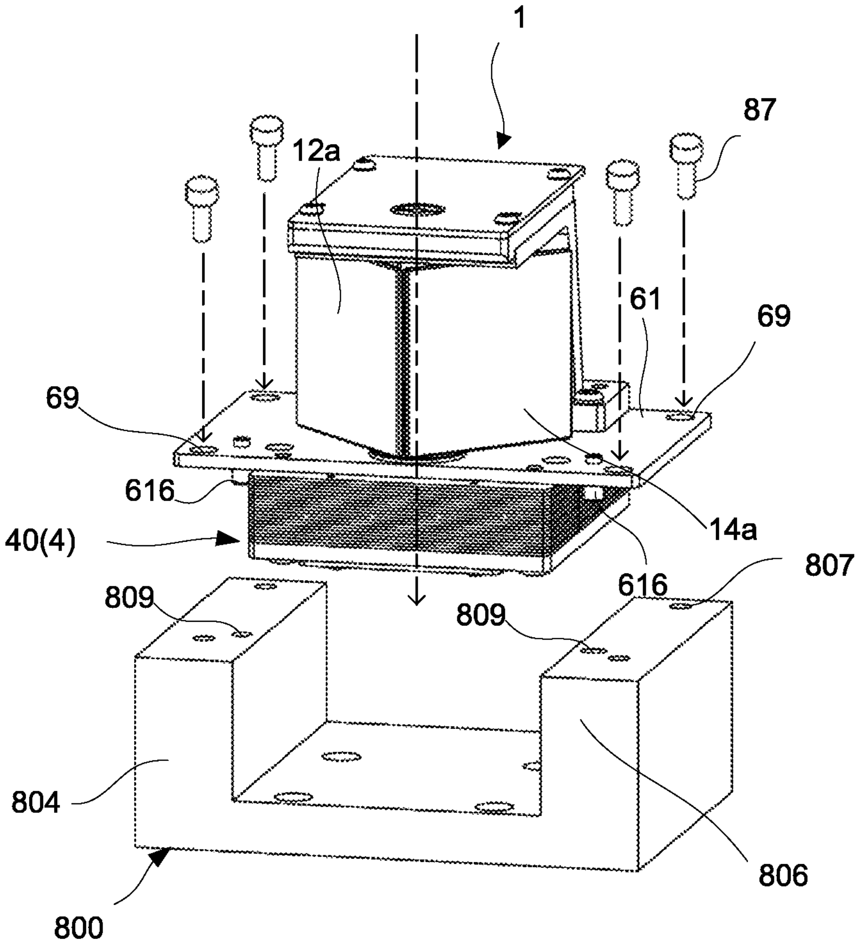
FIG. 9 is a diagram for describing a structure for assembling the rotary reciprocating actuator to a housing.

FIG. 9 is a diagram for describing a structure for assembling the rotary reciprocating actuator to a housing. When attaching rotary reciprocating actuator 1 to the product frame, rotary reciprocating actuator 1 is fixed to fixation stand 800 provided on the frame side (e.g., as a part of the frame).

When the rotation shaft is used as a reference to fix rotary reciprocating actuator 1 to the product housing, it can be desirably accurately fixed by fixing it at a position whose dimension from the reference can be defined, i.e., a position that is set with reference to the position of the movable portion after positioning the movable portion. In addition, it is necessary for the fixing to take into account the influence such as disturbance, and it is desirable to fix the position close to the center of gravity, for example.

Fixation stand 800 is formed with a U-shaped part including fixation walls 804 and 806 provided upright with a space therebetween. Rotary reciprocating actuator 1 is fixed to fixation stand 800 such that core assembly 41 of drive unit 4 is located inside the U-shape. Rotary reciprocating actuator 1 is secured to fixation stand 800 by means of securing member 87 inserted through fixation hole 69 with the axial direction and the upright direction of fixation stand 800 are parallel to each other, and the both side portion of base part 61 being in contact with the upper end surface of fixation walls 804 and 806. Note that in the upper end surface of fixation walls 804 and 806, positioning hole (one long hole) 809 to which positioning pin 616 is inserted is provided in addition to securing hole 807 to which securing member 87 is inserted.

When attaching rotary reciprocating actuator 1 to fixation stand 800, positioning pin 616 parallel to the axis is inserted to positioning hole 809 parallel to the axis direction, so as to turn with this at the center. In this manner, the positions of rotary reciprocating actuator 1 and fixation stand 800 are adjusted. It is possible to perform position adjustment with a rod or the like inserted to the positioning notch part, and perform fixing with securing member 87 inserted to fixation hole 69 and securing hole 807 that are aligned with each other.

The axis direction of rotation shaft 20 is the same as the axis direction of bearings 64 and 65 due to the position of V-shaped mirror 10, and therefore rotary reciprocating actuator 1 can be accurately positioned and fixed to fixation stand 800.

Rotary reciprocating actuator 1 can be manufactured, or fixed to the housing, by fixing each part from in the direction parallel to the axis. In addition, fixation hole 69 is provided at base part 61 between the driving portion (core assembly 41) of drive unit 4 and V-shaped mirror 10. In addition, a hole part and the like for fixing each part including bearing 64 are provided at base part 61, and wall 211B is fixed to fixation stand 800 by using them. They can be positioned and fixed to fixation stand 800 at the same working surface, and thus highly accurate fixing can be achieved.

In this manner, rotary reciprocating actuator 1 can be positioned and fixed with respect to fixation stand (housing) 800 in the direction parallel to rotation shaft 20, and thus can be highly accurately positioned and fixed with less dimension than by fixing with other components. In addition, since the center of gravity is provided between V-shaped mirror 10 and core assembly 41, stable holding can be achieved.

Figure 10:
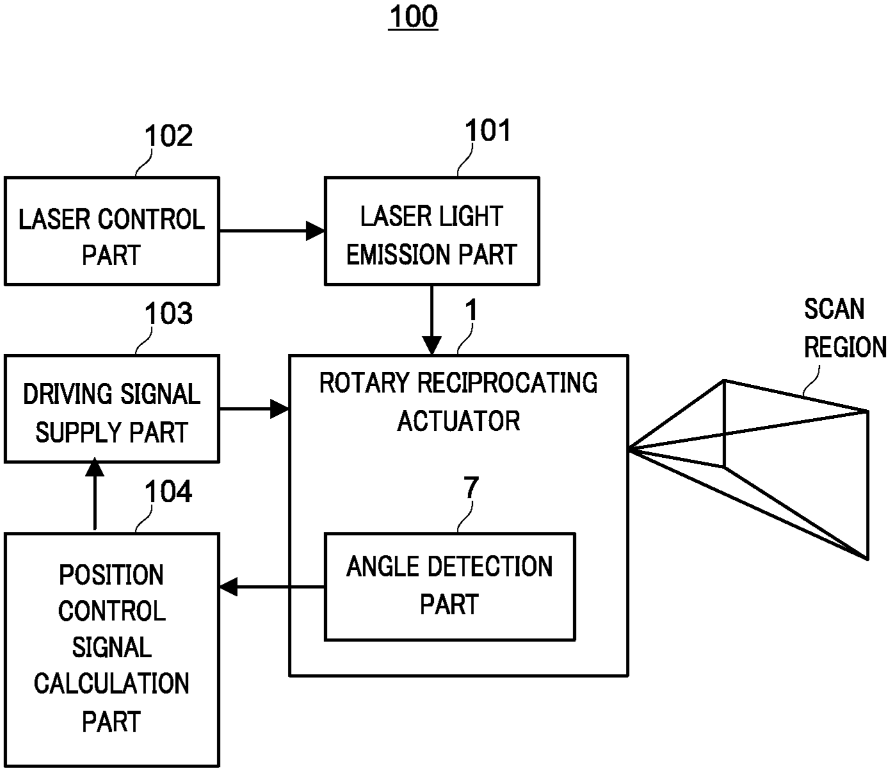
FIG. 10 is a diagram illustrating a configuration of a main part of a scanner system using the rotary reciprocating actuator.

FIG. 10 is a block diagram illustrating a main configuration of scanner system 100 using rotary reciprocating actuator 1.

Scanner system 100 includes laser light emission part (light irradiation part) 101, laser control part 102, driving signal supply part 103 and position control signal calculation part 104 in addition to rotary reciprocating actuator 1.

Laser light emission part 101 includes LD (laser diode) serving as a light source, a lens system for converging laser light output from the light source, and the like, for example. Laser control part 102 controls laser light emission part 101. The laser light emitted from laser light emission part 101 impinges on mirror 121 of rotary reciprocating actuator 1.

With reference to the target angle position and the angle position of rotation shaft 20 (mirror 121) acquired by angle detection part 7, position control signal calculation part 104 generates and outputs a driving signal that sets rotation shaft 20 (mirror 121) to the target angle position. For example, position control signal calculation part 104 generates the position control signal by using the acquired angle position of rotation shaft 20 (mirror 121) and a signal indicating the target angle position converted by using saw waveform data and the like stored in the waveform memory not illustrated in the drawing. Position control signal calculation part 104 outputs the generated position control signal to driving signal supply part 103.

On the basis of the position control signal, driving signal supply part 103 supplies to coils 52 and 54 of rotary reciprocating actuator 1 a driving signal that sets the angle position of rotation shaft 20 (mirror 121) to the desired angle position. In this manner, scanner system 100 can emit scan light from rotary reciprocating actuator 1 to a predetermined scan region.

Overview

As described above, rotary reciprocating actuator 1 according to the present embodiment includes movable member 2 including rotation shaft (shaft part) 20 to which mirror part (movable object) is connected, and magnet 30 fixed to rotation shaft 20. As a movable object, V-shaped mirror 10 is driven into back-and-forth rotation. Note that magnet 30 is a ring magnet where S pole 32*a* and N pole 32*b* are alternately disposed in the circumferential direction at the outer peripheral surface.

In this manner, since magnet 30 turns on the movable member 2 side, there is no influence of the heat generated by the coil during movement on the mirror (movable part) on the movable member side, and thus high output can be achieved by increasing the input current. In addition, a high-amplitude actuator can be achieved by the initial position hold structure with the magnetic spring.

In rotary reciprocating actuator 1, V-shaped mirror 10 is disposed at turning axis 20 such that the shaft center of rotation shaft 20 is adjacently aligned with the gravity center of the V-shaped mirror. In this manner, it is possible to achieve a rotary reciprocating actuator that can be driven with reduced inertia, increased input current, and increased resonance of V-shaped mirror 10, while achieving reduced height and high output.

In addition, since the mirror is a V-shaped mirror, a low-profile scanner configuration can be achieved while ensuring the wide reflecting surface for optical scanning to meet the demand of wide field angle and low profile configuration in a configuration of an optical scanner. Note that the configuration for light emission using V-shaped mirror 10, and the arrangement of the light reception part in the lateral direction are not limited.

In addition, sensor substrate 72 covers the elements of the rotation detection part of the detection part (encoder disk) 7 of sensor component and the like on the outside in the axial direction than unit body 40 (core assembly 41, positioning cover 82, and bottom cover 84). In this manner, sensor substrate 72 can prevent contamination to sensor housing part 626*a*, and in turn, air gap G between magnet 30 and core assembly 41. In this manner, malfunction can be prevented by preventing entry of foreign matters into air gap G, and thus favorable driving can be achieved.

In addition, since magnet 30 is disposed inside drive unit 4 of the rotary reciprocating actuator, the magnet is not disposed outside, and the magnetic flux is not distributed to the outside (front surface side), which can reduce leakage flux to the front surface side. Thus, it can be placed even if there are magnetically sensitive products in the vicinity.

Since core assembly 41 of drive unit 4 has a shape of a rectangular frame block, the installation space of core assembly 41 can be accommodated in a limited space, e.g., a rectangular region (a region as viewed in the axial direction) in the rear surface in base part 61, and thus movable member 2 can be driven with a high amplitude by ensuring a sufficient magnetic path length.

In addition, during the maintenance of angle detection part 7, sensor substrate 72 can be detached by only detaching securing member 77, to expose the sensor components to the outside. The sensor components are rotation angle detection parts such as light emission parts and light reception parts such as optical sensor 78, encoder disk 74 and encoder hub 76 on the mounting surface of sensor substrate 72, for example. Specifically, in the event of malfunction expensive sensor components can be immediately exposed to the outside and easily modified or replaced without discarding each sensor component.

In addition, in the case where the sensor part is an optical sensor, interference of light with sensor housing part 626*a* can be prevented without separately using a light blocking member.

In addition, the movable object is V-shaped mirror 10 (in particular mirror 121) that reflects scan light. In this manner, rotary reciprocating actuator 1 can be used for the use of scanners that perform optical scanning.

In addition, in unit body 40, coils 52 and 54 are surrounded by first to third cores, and thus electromagnetic noise generated from coils 52 and 54 can be suppressed. In addition, leakage flux from magnet 30 and coils 52 and 54 can be suppressed.

In addition, for example, in the embodiment, rotary reciprocating actuator 1 is driven resonantly, but the present invention is also applicable to a case where the actuator is not driven resonantly.

In addition, the configuration of drive unit 4 is not limited to those described in the embodiment. For example, it suffices that the core includes a magnetic pole part that are excited to have a polarity through energization to the coil, and that when the rotation shaft is attached to the fixing body, the magnetic pole part and the outer peripheral surface of the magnet face each other with an air gap therebetween. In addition, it suffices that the coil is configured such that when it is energized, the magnetic flux is favorably generated from one side of the magnetic pole part of the core toward the other side.

Further, the above-described configuration where neutral position holding part 48 provided at the fixing body is attached to second core 44 is not limitative, and it may be provided at other components of the fixing body. In addition, in the above-mentioned cases, neutral position holding part 48 may be housed in second core 44.

Note that in V-shaped mirror 10, first mirror 12 and second mirror 14 may be an integrated mirror, and at least one of first mirror 12 and second mirror 14 and mirror holding part 16 may be integrally formed. Further, mirror holding part 16 and rotation shaft 20 may be integrally formed, and the mirror portion of first mirror 12 and second mirror 14, the mirror holding part and the rotation shaft may be integrally formed.

The embodiments disclosed here are in all respects to be considered illustrative and not restrictive. The scope of the invention is indicated by the claims and not by the description given above, and it is intended to include all modifications within the meaning and scope equivalent to the claims.

INDUSTRIAL APPLICABILITY

The present invention is suitable for LiDAR devices, scanner systems and the like, for example.

REFERENCE SIGNS LIST

1 Rotary reciprocating actuator
2 Movable member
4 Drive unit
7 Angle detection part
10 V-shaped mirror
11 Ridgeline
12 First mirror
14 Second mirror

16 Mirror holding part
20 Rotation shaft (Shaft part)
21 One end portion
23 Other end portion
26 Preload spring
27 Stopper part
28 Spacer
30 Magnet
32*a*, 32*b* Pole
32*c* Magnetic pole switching part
40 Unit body
41 Core assembly
42 First core
44 Second core
46 Third core
48 Position holding part
50 Coil member
52, 54 Coil
52*a*, 54*a* Coil end
56, 57 Bobbin
58 Terminal
60 Frame part
61 Base part
62 Shaft holder
64, 65 Bearing
66 Bearing housing
67 Substrate
69 Fixation hole
72 Sensor substrate
74 Encoder disk
76 Encoder hub
77, 81, 86*a*, 87 Securing member
78 Optical sensor
79, 616 Positioning pin
82 Positioning cover
84 Bottom cover
86*b* Secured member
87 Securing member
420*a*, 420*b* Magnetic pole of end portion
421, 421*a*, 421*b* Rod member
422 Connection side portion
423, 423*a*, 423*b* Lateral side portion
424 Commutating pole part
561, 571 Flange
563, 573 Holding part
612 Opening
614 Connection hole
624 Upright wall
626 Wall
626*a* Sensor housing part
627 Insertion hole
800 Fixation stand
804, 806 Fixation wall

The invention claimed is:

1. A rotary reciprocating actuator comprising:

a movable member including a shaft part with a magnet fixed on an outer periphery, wherein a V-shaped mirror is held such that a ridgeline of the V-shaped mirror is along the shaft part, and the movable member is supported in a rotatable manner back and forth around an axis through the shaft part; and a unit body including a plurality of magnetic poles, a coil member, and a magnetic member, the plurality of magnetic poles facing the magnet in a radial direction of the shaft part and being separated from each other in a circumferential direction of the shaft part, the coil member being configured to form, together with the magnet, an electromagnetic drive part configured to rotate back and forth the movable member, the magnetic member facing the magnet in the radial direction of the shaft part and being disposed between the plurality of magnetic poles in the circumferential direction to bias the movable member toward an initial position of back- and forth rotation by attracting the magnet, wherein the electromagnetic drive part sways the V-shaped mirror while maintaining an angle of the V-shaped mirror by rotating back and forth the movable member.

2. The rotary reciprocating actuator according to claim 1, wherein the shaft part fixes the V-shaped mirror with a shaft center of the shaft part disposed at a gravity center of the V-shaped mirror or at a vicinity position including an adjacent position of the gravity center.

3. The rotary reciprocating actuator according to claim 1, wherein the shaft center of the shaft part is located inside a triangular region defined with a virtual line connecting separated ends of a mirror portion disposed in a V-shape.

4. The rotary reciprocating actuator according to claim 1, wherein one of both surfaces of the unit body in an axial direction is covered with a shaft supporting body, and wherein the shaft supporting body rotatably supports the shaft part.

5. The rotary reciprocating actuator according to claim 1, wherein the plurality of magnetic poles is two poles disposed to face each other with the magnet between the two poles, wherein different magnetic poles are alternately disposed in a circumferential direction at an outer peripheral surface of the magnet, and wherein a magnetic pole switching part of the magnetic poles provided at an outer periphery of the magnet is configured to be located at an angle of facing a center portion of each of the plurality of magnetic poles in the circumferential direction when the magnet is located at an initial angle corresponding to the initial position.

6. The rotary reciprocating actuator according to claim 1, wherein the unit body includes a core assembly in which the coil member is disposed, the core assembly including the plurality of magnetic poles and disposed to surround the magnet in the radial direction, and wherein the core assembly includes a lamination core including a stack of a steel sheet made of a magnetic member.

7. The rotary reciprocating actuator according to claim 6, wherein the coil member is configured to be surrounded by the core assembly from four sides around the shaft.

8. The rotary reciprocating actuator according to claim 1, further comprising a base part having a plate shape configured to fix the unit body on a rear surface side, and dispose the V-shaped mirror on a front surface side through the shaft part protruding to the front surface side via a through hole in parallel to an axial direction, wherein the base part and the unit body are positioned or fixed with a securing member secured in a direction parallel to the shaft part.

9. The rotary reciprocating actuator according to claim 1, further comprising a rotation detection part disposed on a side opposite to the unit body to sandwich the V-shaped mirror in an axial direction between the rotation detection part and the unit body, the rotation detection part being configured to detect a rotation of one end portion of the shaft part.

10. The rotary reciprocating actuator according to claim 9, wherein the rotation detection part includes a sensor substrate on which a sensor configured to detect a rotation of the one end portion is mounted,
wherein a wall configured to rotatably support one end portion of the shaft part is provided, and
wherein the sensor substrate is detachably attached to the wall so as to cover the one end portion.

11. An optical scanning device, comprising:
the rotary reciprocating actuator according to claim 1; and
a light irradiation part configured to apply scan light to the V-shaped mirror of the rotary reciprocating actuator.

* * * * *